United States Patent [19]

Misra et al.

[11] Patent Number: 4,871,428
[45] Date of Patent: Oct. 3, 1989

[54] METHOD FOR IN SITU FORMING LEAD-ACID BATTERIES HAVING ABSORBENT SEPARATORS

[75] Inventors: Sudhan S. Misra, Lansdale; Terrence M. Noveske, Pipersville, both of Pa.

[73] Assignee: C & D Charter Power Systems, Inc., Plymouth Meeting, Pa.

[21] Appl. No.: 173,194

[22] Filed: Mar. 24, 1988

[51] Int. Cl.$^4$ ............................................. H01M 10/12
[52] U.S. Cl. ................................... 204/2.1; 29/623.1; 429/225
[58] Field of Search ............... 429/225, 228, 252, 204; 204/2.1; 29/623.1

[56] References Cited

U.S. PATENT DOCUMENTS

| | | | |
|---|---|---|---|
| 3,591,422 | 7/1971 | Bernholtz et al. | 429/204 |
| 3,652,341 | 3/1972 | Halsall et al. | 204/2.1 |
| 3,713,889 | 1/1973 | Lecouffe | 204/2.1 |
| 3,753,784 | 8/1973 | Elsenacher et al. | 429/145 |
| 3,862,861 | 1/1975 | McClelland et al. | 429/94 X |
| 3,888,700 | 6/1975 | Larsen | 429/166 |
| 3,980,497 | 9/1976 | Gillman et al. | 429/145 |
| 4,018,971 | 4/1977 | Scheibley et al. | 429/105 |
| 4,098,961 | 7/1978 | Sabatino | 429/48 |
| 4,269,910 | 5/1981 | Graham et al. | 429/190 |
| 4,288,913 | 9/1981 | Parsen et al. | 429/190 |
| 4,317,872 | 3/1982 | Varma | 429/190 |
| 4,359,508 | 11/1982 | Meighan et al. | 429/52 |
| 4,391,036 | 7/1983 | Kishimoto et al. | |
| 4,414,302 | 11/1983 | Jache et al. | 429/190 |
| 4,421,832 | 12/1983 | Uba | 429/72 |
| 4,455,358 | 6/1984 | Graham et al. | 429/190 |
| 4,475,990 | 10/1984 | Katsuhiro et al. | 204/2.1 |
| 4,556,614 | 12/1985 | Mehaute et al. | 429/191 |
| 4,588,662 | 5/1986 | McManis et al. | 429/52 |
| 4,631,241 | 12/1986 | Kawanami | 429/225 |

Primary Examiner—Anthony Skapars

[57] ABSTRACT

A lead-acid battery having electrolytic-absorbent separator is formed in situ to produce sponge lead and lead dioxide active material. The method includes cooling the electrolyte to below room temperature, introducing a quantity of cooled electrolyte into the battery and charging the battery to a preselected degree. The battery is further filled with electrolyte to provide electrolyte saturated plates and separators and is further charged to a preselected degree defining a fully charged state.

25 Claims, 1 Drawing Sheet

METHOD FOR IN SITU FORMING LEAD-ACID BATTERIES HAVING ABSORBENT SEPARATORS

FIELD OF THE INVENTION

This invention relates to forming lead-acid batteries. In lead-acid battery technology, "forming", "formation" and variants of these words denote the process of converting lead oxide to lead at the negative plate and converting lead to lead dioxide at the positive plate of a lead-acid battery precursor to which electrolyte is added to produce the lead-acid battery. "Jar formation" denotes that the battery precursor (which is often referred to as the "battery") is "formed" with the plates in the battery cases, where the plates reside during battery operation. Jar forming is desirable to maximize efficiency and minimize time consumed by the forming and associated battery manufacturing processes.

DESCRIPTION OF THE DRAWINGS

The drawings affixed hereto are provided to illustrate the problem solved by this invention. The drawings do not depict practice of the invention or batteries formed using the invention.

DISCUSSION OF THE PROBLEM

Figure 1:
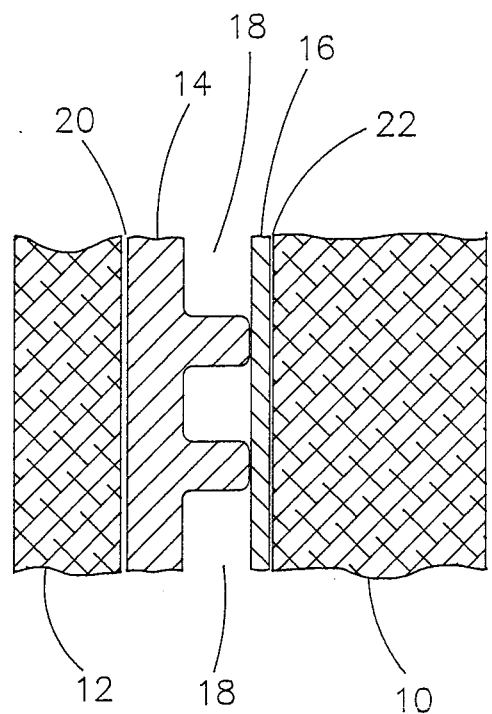
FIG. 1 is a broken sectional view of positive and negative metal plates, a conventional non-absorbent separator and a conventional retainer mat in a lead-acid battery.

FIG. 1 illustrates a conventional lead-acid battery having a non-absorbent separator which is typically microporous rubber-bound silica or microporous polyethylene-bound silica. In FIG. 1, 10 denotes a positive plate, 12 denotes a negative plate, 14 denotes a conventional, non-absorbent, microporous separator and 16 denotes a retainer mat used in many conventional lead-acid batteries having non-absorbent, microporous separators. Retainer mat 16 is typically a relatively thin electrolyte-absorbent glass mat made from coarse glass fibers and a binder, and is used to retain active material in place on the surface of the positive plate 10.

Conventional non-absorbent rubber or polyethylene separators 14 in FIG. 1 are typically only about 30% to about 50% porous, with pore diameter ranging from about 0.1 to about 1.0 micron and with mean pore diameter being from about 0.1 to about 0.3 microns. A conventional non-absorbent separator 14 occupies very little space between the plates (as compared to an electrolyte-absorbent separator, discussed in more detail below) and is surrounded by sulfur acid electrolyte. Specifically, liquid sulfur acid electrolyte occupies space 18 between separator 14 and retainer mat 16 and also fills space 20 between separator 14 and negative plate 12. The liquid sulfur acid electrolyte penetrates retaining mat 16. The liquid electrolyte also fills any space 22 between retaining mat 16 and positive plate 10. If no retaining mat 16 is used, liquid sulfur acid electrolyte fills the space between separator 14 and plate 10.

Because of the extremely small size of the pores in separator 14, lead dendrites, which would otherwise grow from negative plate 12 to positive plate 10, cannot grow through the separator and short out the plates. Even in the relatively infrequent case where dendrites grow and partially work their way through the extremely small pores in separator 14, such dendrites have extremely small diameter and usually break as they endeavor to grow through electrolyte in space 18.

Referring to FIG. 2, 10 again represents a positive plate in a lead-acid battery and 12 again represents a negative plate in a lead-acid battery. An electrolyte-absorbent separator designated 24 is typically a glass mat material made from glass microfibers, intertwined by a process similar to a paper manufacturing process. When the liquid sulfuric acid electrolyte is introduced into the battery, electrolyte-absorbent glass mat separator 24 absorbs the liquid electrolyte like a sponge, firmly and intimately contacting the plate 10, 12, thereby assuring good electrolyte-plate contact.

Figure 2:
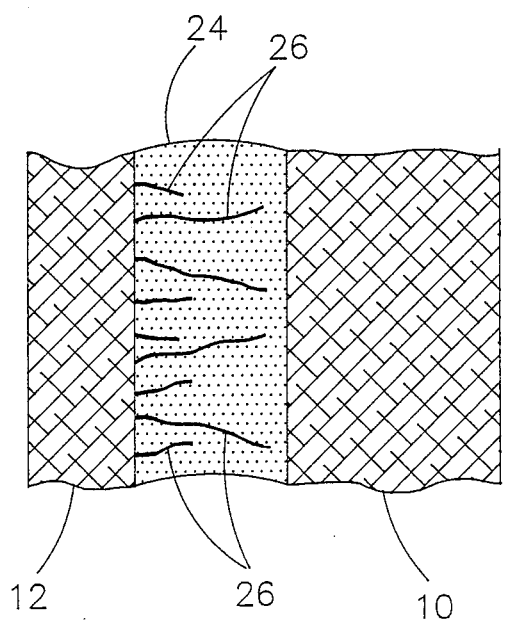
FIG. 2 is a broken sectional view of a lead-acid battery including positive and negative plates and an electrolyte absorbent separator between those plates, depicting lead dendrites growing through the separator.

Electrolyte-absorbent glass mat separators, such as designated 24 in FIG. 2, are highly porous, having porosity exceeding 95%, with pore diameter ranging from about 2.0 (two) to about 35.0 (thirty-five) microns and with mean pore diameter ranging from about 2.0 to about 6.0 microns.

If the cell compartment of a lead-acid battery having electrolyte-absorbent glass mat separators is saturated with liquid electrolyte prior to formation, this frequently results in lead dendrites growing from the negative plates to the positive plates through the absorbent glass mat separators during the formation process, shorting out the cells defined by pairs of adjacent plates. The high porosity and large pore size of absorbent glass mat separators (relative to the porosity and pore size of conventional rubber and polyethylene separators) permit lead dendrites to grow through glass mat separators much more easily than through rubber or polyethylene separators. Lead dendrites growing through electrolyte-absorbent glass mat separator 24 are designated 26 in FIG. 2.

In a lead-acid battery having an electrolyte-absorbent separator, space between the plates is fully occupied by the separator once it absorbs the liquid sulfuric acid electrolyte. Even though the electrolyte-absorbent separator presents a tortuous path for a lead dendrite such as illustrated as 26, pores in the electrolyte-absorbent separator are sufficiently large and the electrolyte-absorbent separator is sufficiently porous that a continuous pore can extend from one lateral surface of the separator to the other, providing a tunnel-like path through the separator, between plates 10, 12, for growth of a dendrite.

In the relatively large pores provided by an electrolyte-absorbent glass mat separator (where pore size is large relative to non-absorbent separators), the electrolyte can be locally completely depleted to water. This is because separator 24 presents resistance to fluid flow between battery plates 10, 12, through the pores of the separator, whereas there is negligible resistance to fluid flow through open spaces 18, between battery plates 10, 12, in a conventional lead-acid battery having non-absorbent separators such as illustrated in FIG. 1.

An electrolyte-absorbent battery separator as illustrated in FIG. 2 has localized areas where the acidic electrolyte can essentially convert to water. In these areas, the danger of dendrite formation is great; the acid-free water provides an excellent ionic medium for soluble lead sulfur to grow into a dendrite. The lead sulfur essentially reduces, dendrites form at the negative plate, and these dendrites can grow and extend from the negative battery plate to the positive plate, as shown in FIG. 2. The dendrites can grow from the negative plate end of a local tunnel-like passage through separator 24 to the other end uninterrupted by electrolyte acid, if the acid is trapped elsewhere in the electrolyte-absorbent separator and the liquid in the tunnel-like passage is essentially water.

This does not happen in a battery having conventional non-absorbent separators, such as illustrated in FIG. 1, where area 18 between the plates is washed with acid essentially all the time. The conventional, non-absorbent separator does not intimately contact both plates simultaneously (even if no retaining mat 16 is used) and hence the likelihood of a dendrite growing from a negative plate through a non-absorbent separator is low. The conventional non-absorbent separator fits between the plates as illustrated in FIG. 1 but does not contact both of the adjacent plates in the sandwich-like manner that electrolyte-absorbent separator 24 fits (after separator 24 has absorbed the liquid sulfuric acid electrolyte and has firmly contacted the plates).

The intimate contact between the electrolyte-absorbent separator and the plate surfaces makes it easy for a dendrite forming at the negative plate to grow into an adjacent separator pore and from there into a tunnel-like passageway through the electrolyte-absorbent separator.

In summary, as between a lead-acid battery having non-absorbent separators and one having electrolyte-absorbent glass mat separators, there are differences not just of separator pore size and degree of separator porosity, but also the electrolyte-absorbent separator may have a continuity of large pores defining a tunnel-like path locally depleted of electrolyte, increasing the risk of lead dendrites growing through the separator with associated increased risk of shorting out adjacent plates. In these bigger pores in an absorbent separator, water can be in the pores. The water holds more lead ions from the soluble lead sulfate and hence dendrites can grow right through the water. Furthermore, the intimate contact between the electrolyte-absorbent separator and the plate surfaces makes it easy for dendrites growing from the negative plates to find their way into and onward through the separators, presenting a danger of shorting out the adjacent plates.

Sealed liquid electrolyte lead-acid batteries, having absorbent glass separators and narrow plate separation relative to plate thickness, are almost impossible to consistently jar form using standard techniques for flooded batteries. (In such narrow plate separation batteries, plate separation is indicative of the ratio of available acid to active material).

Conventionally, only batteries using non-absorbent separators, typically microporous rubber-bound silica or microporous polyethylene-bound silica, are jar formed. This is because these separators have low porosity and utilize ultra fine pores which help to prevent dendritic lead from growing through the separators and shorting out adjacent plates, as explained above.

Unfortunately, sealed and therefore acid-limited lead-acid batteries using microporous rubber or microporous polyethylene separators are not as efficient in oxygen recombination and energy output as acid-limited lead-acid batteries utilizing electrolyte-absorbent glass mat separators. This is because, unlike rubber and polyethylene separators, absorbent glass mat separators absorb the electrolyte and contact the plates on both sides of the separators, assuring good electrolyte-plate contact and higher energy efficiency.

In a lead-acid battery, sulfuric acid converts to water from reaction with lead oxide available at the plates; during this reaction lead sulfate precipitates in the electrolyte. Lead sulfate is somewhat soluble in water; this solubility increases with temperature. As a result, lead ion significantly high quantities goes into solution in the electrolyte when the electrolyte is added to the battery precursor and contacts the plates. These ions become metallic lead at the negative plate during charging, forming needle-like lead dendrites in the cell. The lead dendrites easily grow through the glass separator, especially through the continuous pores in which the electrolyte is depleted, thereby shorting the cell. This is a continuing, serious problem in jar forming lead-acid batteries having absorbent glass mats separating relatively closely spaced adjacent plates in the battery cells.

DESCRIPTION OF THE PRINTED PRIOR ART

Relevant prior U.S. Pat. Nos. include 3,528,855; 3,591,422; 3,652,341; 3,713,889; 3,753,784; 3,884,724; 3,980,497; 4,018,971; 3,713,889; 3,888,700; 4,098,961; 4,188,461; 4,269,910; 4,288,913; 4,317,872; 4,359,508; 4,391,036; 4,414,302; 4,444,854; 4,455,358; 4,475,990; 4,556,614 and 4,588,662. Of these patents, the most relevant are U.S. Pat. Nos. 3,591,422; 3,753,784; 4,098,961; 4,444,854 and 4,475,990 with '990 being the single most relevant patent. These patents constitute the most relevant printed prior art.

'990 discloses a method for forming lead-acid storage batteries in two stages to improve high rate discharge characteristics of the batteries and to increase battery life cycle. In a primary forming stage depicted in FIG. 1 of '990, the "electrodes" or "plates" (in the prior art and for present purposes the two terms are interchangeable) are partially immersed in an electrolyte solution and are partially charged. The initial aqueous electrolyte solution can be alkaline, neutral or slightly acidic. In a secondary forming stage, shown in FIG. 2 of '990, charge is applied to electrodes fully immersed in concentrated sulfuric acid electrolyte.

The '990 procedure includes producing lead-calcium-tin alloy grids, which are pasted with a mixture of lead powder, sulfuric acid and water, and dried to provide conventional pasted electrodes. Batteries manufactured from these plates use an aqueous solution in a primary forming stage. The primary forming solutions include solutions of 0.5 weight percent NaOH, 2.0 weight percent $Na_2SO_4$, 1.0 weight percent $H_2SO_4$, 10.0 weight percent $H_2SO_4$ and 15.0 weight percent $H_2SO_4$.

In the patent primary forming stage disclosed in '990, the electrodes are only partially immersed; the solution does not extend above their top edges. The preferred immersion is between 20.0% and 80.0%. A first charge current of 10 amps is applied for about two (2) minutes. In the secondary stage, concentrated sulfuric acid, dissimilar from the primary forming solution, is added (without discarding the primary forming solution) to adjust the electrolyte to a sulfuric acid concentration of 28 weight percent. Thereafter, a 10 amp current is applied for 50 hours.

'990 further teaches importance of only partial immersion of the plates in the electrolyte during the first stage of formation at column 6, paragraph 2, where electrolyte during primary stage formation "is carried to the part of the electrode above the liquid level by a capillary action so as to sufficiently reform the interface between the grid and the active material." This results in an increase in current density at the lower part of the electrode plate, thereby increasing the probability of alpha-$PbO_2$ being formed at lower regions of the electrode. With more alpha-$PbO_2$ formed at lower regions of the electrode, the electrode plate tends to discharge dissimilarly from top to bottom. (Conversely, when the electrodes are completely submerged, alpha-$PbO_2$ forms uniformly on both upper and lower regions of the electrodes.) This permits increased acid concentration in the electrolyte (which surrounds only the lower portions of the electrodes) to attack the electrodes, contributing to early fall-off of active material, thereby increasing likelihood of premature battery discharge.

'990 makes no mention of dendrite formation or dendrite shorting nor does '990 describe the separators except as "3 a separator" at column 3, line 37. Accordingly, '990 does not exhibit any appreciation of the problem of the growth of lead dendrites through absorbent glass mat separators. '990 restricts electrolyte used in the primary stage formation to alkaline, neutral or weakly acidic electrolyte, with strongly acidic electrolyte being added during the second formation stage.

The strength of sulfuric acid during both the primary and secondary stages of charging as taught by '990 ranges from 1 weight percent (mixed with 2 weight percent of $Na_2SO_4$) to 30 weight percent. This weight percent range corresponds to a specific gravity range of 1.005 to 1.219. Addition of stronger acid after application of the first charge increases electrolyte acidity in '990.

'422 discloses a lead-acid battery having a liquid-absorbent material, interposed between the battery plates, which retains sufficient concentrated acid to activate the cell when water is added. The absorbent material is preferably saturated with acid to about seventy-five percent (75%) of capacity of the absorbent separator material (which, of course, is less than the total acid capacity of the battery).

'784 discloses a battery plate separator having at least three layers, the interior layer being resistant to short circuits and to migration of heavy metal ions. The interior layer preferably consists of microporous latex-bound diatomaceous earth. The exterior layers are formed from an ultrafine fiber mass which fits tightly against the electrodes. The microporous material has a pore diameter preferably ranging between one (1) and twenty (20) microns and more preferably ranging between five (5) and fifteen (15) microns. Hence, '784 seeks to hinder dendrite growth by interposing a physical barrier between adjacent plates.

'961 discloses manufacturing a lead-acid battery where battery plates are contacted with formation electrolyte. A charge is then applied and the formation electrolyte is drained away. The plates are then contacted with development electrolyte to increase the specific gravity of residual electrolyte retained in the battery plates. This is followed by deeply discharging the plates and reducing the amount of electrolyte to about ten percent (10%) of total electrolyte capacity of the battery '854 discloses a lead-acid cell having reduced susceptibility to shorting due to deep discharge or charge reversal. The '854 cell contains an inert, porous short-inhibitor between the electrode plates and the separators. The short-inhibitor is a fine mesh fabric formed from an acid and oxidation-resistant polymer. Hence, '854, similarly to '784, employs a physical barrier to prevent dendritic shorts between adjacent electrodes.

U.S. Pat. No. 3,652,341 discloses a method of making a dry charged battery. The steps of the method include installing battery elements into a cell compartment, adding forming electrolyte to the cell compartment, forming the battery elements, removing from about 70 to about 97 weight percent of the forming electrolyte based on the total weight of the forming electrolyte in the battery after completion of the forming step by applying an accelerative force to the battery and installing sealing means in the battery to prevent ingress of air into the cell compartment. The accelerative force is typically a centrifugal force.

U.S. Pat. No. 3,980,497 discloses a rechargeable electrode chemical cell containing an alkaline liquid electrolyte, at least one cathode and at least one zinc anode subject to dendritic growth on charge. The cell further contains a cellulosic separator material interleaved between the anode and cathode comprising a first microporous and uniformly permeable bibulous layer adjacent to and in contact with the anode. The material retains electrolyte in the amount of about 0.55 to about 0.95 grams of alkaline electrolyte per cubic centimeter of separator. the bibulous layer is preferably formed of cotton cellulosic fibers. The cell further comprises a second such bibulous layer adjacent to and in contact with the cathode. The cell still further comprises a semipermeable membrane formed of regenerated cellulose interposed between the first and second bibulous layers and uniformly bonded substantially throughout its surface to each of the bibulous layers with a thin layer of gelling agent to form a composite laminated separator.

U.S. Pat. No. 4,018,971 discloses use of gels as battery separators for soluble electrode cells. A gel of hydrochloric acid and powered silica having low resistance and high compatibility with a fuel cell environment is impregnated into a foam sheet. The foam sheet is placed within a porous polymer envelope which is subsequently sealed on all sides.

U.S. Pat. No. 3,713,889 discloses a process for fixing relative charging states of electrodes in an alkaline storage cell. The process includes the steps of charging the cell in its open unsealed state to effect full total charge of the positive electrode and, thereafter, overcharging the cell still in an open unsealed state to provide a charged capacity to the negative electrode in excess of the total capacity of the fully charged positive electrode but less than the total capacity of the negative electrode. Overcharging is effected at a temperature below zero degrees Centigrade.

U.S. Pat. No. 3,888,700 discloses an absorbent separator for an electric battery. The electric battery has an anode, a cathode mix comprising a depolarizer and an aqueous electrolyte solution and an absorbent separator sheet material between the anode and cathode. The absorbent separator consists of an elastomeric resin binder forming a continuous matrix blended with a gelling agent capable of absorbing and retaining battery electrolyte. The elastomeric resin binder comprises from about 10 to about 30% by weight of the separator with the balance being gelling agent. The binder and gelling agent are dry blended, whereby the gelling agent is not gelled and the separator is in the form of a film having a thickness from about 3 to about 15 mils.

U.S. Pat. No. 4,098,961 discloses a method for manufacturing a water activatable lead acid storage battery. The method includes forming plates by bringing them into contact with a formation electrolyte and applying current thereto, draining the formation electrolyte from the battery, bringing the plates into contact with a development electrolyte to increase the specific gravity of residual electrolyte retained in the battery elements, and deep discharging the battery plates. The method further includes reducing the amount of electrolyte in the battery to an amount in the range of from about 10% by volume of total electrolyte capable of being added to the battery to the amount of electrolyte retained by saturated battery elements. The amount of sulfate resulting from deep discharge and residual sulfuric acid electrolyte retained within the battery elements, upon the addition of water and charging, yields an end-of-charge electrolyte having an acceptable specific gravity.

U.S. Pat. No. 4,269,910 discloses an electric chemical cell having a gelled anode-electrolyte mixture. The electric chemical cell comprises an anode, aqueous alkaline electrolyte solution, a separator and a cathode. The anode consists of an intimate gelled mixture of a powdered metal, aqueous alkaline electrolyte solution and an agent capable of gelling the mixture. The agent comprises a material capable of absorbing water and has a carbohydrate backbone having water soluble side chains grafted thereon.

U.S. Pat. No. 4,288,913 discloses a method of forming in situ gelled anodes. The method includes mixing a powdered anode metal with a gelling agent and with liquid means other than the gelling agent for maintaining, during subsequent gelling, a homogeneous mixture of the powdered metal, the gelling agent and a liquid. The gelling agent is capable of gelling the powdered anode metal when in the presence of an aqueous electrolyte solution. The resulting ungelled mixture is then dispensed into an electrolyte solution in an electric chemical cell, whereby the substantially homogeneously gelled anode is formed in situ.

U.S. Pat. No. 4,317,872 discloses a lead-acid battery with gel electrolyte. The battery includes a container, a plurality of alternating positive and negative electrodes disposed in the container and separator means disposed between the electrodes. The separator comprises a silicate component integrally mixed with an oxygen compound of boron to form a microfiber glass mat and a gel electrolyte in substantial physical contact with the positive and negative electrodes and separators in each cell. The electrolyte comprises a sulfuric acid component and a silica component derived from an aqueous colloidal dispersion of silica particles, with means causing a negative electric charge on the surface thereof to cause the particles to repel each other and catalyze formation of siloxane cross-linkages.

U.S. Pat. No. 4,359,508 discloses a method of producing a lead-acid storage battery having a cell compartment and a dry charge battery element composed of a plurality of positive and negative plates with separators therebetween. The method includes forming and drying the battery element, installing the element in a cell compartment, storing the battery and ultimately, activating the battery and placing it in float service. The improvement includes reducing initial on-charge polarization of the negative plates to not greater than zero while maintaining on-charge polarization of the positive plates sufficiently high that complete anodization of the bare metal is forced to occur when the battery is first charged to the extent that on-charge polarization of the positive plates becomes greater than zero.

U.S. Pat. No. 4,391,036 discloses a process for producing a sealed lead-acid battery. The method includes the steps of positioning a plate group in a battery container with the plate group being formed of positive and negative plates with separators therebetween. The separators are formed mostly of glass fibers having diameters of not more than one micron. The next step includes arranging a viscosity increasing agent in the peripheral part of the plate group, pouring a first sulfuric acid electrolyte into the container in an amount less than the total pour volume of the plate group, pouring a second sulfuric acid electrolyte into the container such that the total amount of poured electrolyte is at least equal to the total pour volume of the plate group and sealing the container to form the sealed lead-acid battery.

U.S. Pat. No. 4,414,302 discloses a method of making a leaded storage battery having a thixotropic gel electrolyte. The electrolyte consists substantially of sulfuric acid and a gelling agent wherein the sulfuric acid is electrochemically bonded in the active material of the electrodes in the battery. The battery is thereafter filled with a gelling agent and a sulfuric acid, the concentration of which is insufficient for the formation of a gel, but which is sufficient for initiating a charging process upon application of a voltage.

U.S. Pat. No. 4,455,358 discloses electrochemical cells having a gelled anode-electrolyte mixture. The electrochemical cell includes an anode, an aqueous alkaline electrolyte solution, a separator and a cathode. The anode comprises an intimate gelled mixture of a powdered metal, aqueous alkaline electrolyte solution and an agent capable of gelling the mixture. The agent comprises a material capable of absorbing water and has a carbohydrate backbone having water soluble side chains drafted thereon.

U.S. Pat. No. 4,556,614 discloses a method of producing a polymer based solid electrolyte for an electrochemical cell. The method includes mixing at least one first complexing polymer having in its monomer pattern at least one heteroatom and having at least one ionizable alkaline salt complexed therein with at least one second polymer miscible with the complexing polymer and having cross-linkable functions, with the second polymer being selected from the group consisting of acrylic polybutadiene nitrile elastomers, methylpolyethylene acrylate elastomers, elastomer polyesters and polyglymous polymers grafted onto styrene, then physically cross-linking the cross-linkable functions while bringing the complexing polymer to an essentially amorphous state during the physical cross-linking period.

U.S. Pat. No. 4,588,662 discloses a method and device for filling cells of a battery with electrolyte. The battery includes a reservoir having dual chambers including a partition between the chambers for retaining an electrolyte premix component within respective chambers. A conduit sealably communicates with a respective evacuated multi-cell reserve battery and the reservoir, with the conduit having a frangible seal at the reservoir terminus thereof and means for activation of the reservoir to cause transfer of electrolyte from the reservoir through the conduit into the battery cells.

Battery formation is also discussed in the well-known work "Electric Storage Batteries" by J. B. Vinal at page 3 and at pages 35 through 51. Vinal notes that, in forming Plante plates, the cell is allowed to rest after charging while local action transforms a peroxide covering on the positive plates into lead sulfate. From time to time polarity is reversed and the sequence of charging and discharging is repeated to increase cell capacity (page 3).

Vinal further notes that one has the choice either of completely drying the plates before formation or of transferring the plates to soaking baths in forming tanks while the plates are still moist:

"Freshly pasted plates require rapid handling because partial drying is likely to lead to difficulties when the plates are formed (page 35) . . . . Lead carbonate paste is made from basic or normal lead carbonate and lead oxide, and formed into a paste in an alkaline solution. Negative plates are prepared from this paste by reduction and the positive plates are prepared by oxidizing the negative plates" (page 37).

In discussing formation of pasted plates, Vinal states:

"The plates are electrolytically oxidized and reduced in dilute sulfuric acid or sulfate solution. The plates that are to become the positives are made the anode in the forming tank, container or jar, and the plates for the negatives are made the cathode" (page 37).

Commercially available lead-acid batteries intended for automotive use utilize about fifty thousandths (0.050 inches) separation between the plates with positive plate thickness ranging from about fifty thousandths (0.050 inches) to about sixty-five thousandths (0.065 inches) and with negative plate thickness ranging from about forty-five thousandths (0.045 inches) to about fifty-five thousandths (0.055 inches). Commercially available lead-acid batteries intended for industrial use utilize as little as about fifty thousandths (0.050 inches), but more typically about seventy thousandths (0.070 inches), separation between the plates with positive plate thickness ranging from about one hundred twenty thousandths to about one hundred forty thousandths (0.120 to about 0.140 inches) and negative plate thickness ranging from about seventy-five thousandths (0.075 inches) to about ninety thousandths (0.090 inches) prior to forming. These figures are typical; there are exceptions. Such industrial batteries, utilizing absorbent glass mat separators and having greater amounts of plate active material relative to the electrolyte volume than do automotive batteries, are highly susceptible to dendrite shorting using conventional formation techniques.

Conventional tank forming is an expensive, labor intensive process.

SUMMARY OF THE INVENTION

A lead-acid battery having electrolyte-absorbent, preferably glass mat, plate separators is formed in situ to produce sponge lead and lead dioxide active material on lead metal grids thereby defining plates on respective sides of the separator, to facilitate electrochemical reaction between the plates on either side of the separator for electrical energy production by the battery.

The method includes cooling lead-acid battery electrolyte to below room temperature. A quantity of the cooled lead-acid battery electrolyte is introduced into the battery with the quantity introduced being less than the total electrolyte volume capacity of the battery when the battery separators are electrolyte-saturated. The battery is charged to respectively oxidize and reduce lead at surfaces of the respective plates to a preselected intermediate degree. The battery is filled with electrolyte or water or a mixture thereof, to provide a quantity of electrolyte liquid at least equal to and preferably exceeding the total electrolyte volume capacity of the battery plates and separators when the battery plates and separators are all electrolyte-saturated. This filling may be performed while charging or charging may be halted to perform the filling. If filling is performed while charging, it is important that filling not be performed too early during the charging; otherwise the benefits of using an initial quantity of electrolyte less than the total electrolyte volume capacity of the separators and plates when electrolyte-saturated may be lost.

The excess electrolyte or water which is added as an intermediate step of the process is preferably provided in an amount equal to the amount of water driven off from the electrolyte as gaseous hydrogen and oxygen by electrolysis during the final charging of the formation process. If charging had been halted during the addition of the electrolyte or water during the intermediate step, the battery is then further charged to respectively further oxidize and reduce lead at the surfaces of the respective plates to a preselected degree of defining a fully charged state of the battery; during this further charging excess water is driven off, leaving the battery with the proper amount of electrolyte.

The lead-acid battery electrolyte has a relatively high specific gravity at room temperature. The separators are electrolyte-absorbent, preferably glass mat of the type currently commercially used in lead-acid batteries, and are highly porous, with porosity exceeding 95%. The pores of the separators are preferably from about two (2) to about thirty-five (35) microns in diameter. The electrolyte is preferably cooled to below fifty degrees Farenheit (50 F.) and more preferably to between about zero (0) and about fifty (50) degrees Farenheit prior to being introduced into the battery; the electrolyte can be even colder. The electrolyte specific gravity at room temperature is preferably no greater than about 1.32.

The specific gravity of the electrolyte at room temperature is preferably sufficient to provide adequate lead sulfate to produce additional lead and lead dioxide surfacing of the plates according to rated capacity of the battery.

The temperature to which the electrolyte is cooled is linked to battery size expressed in rated amp hour capacity. The larger the battery, the lower the temperature to which the electrolyte is desirably cooled, to offset heat generated during forming. The larger the battery amp hour capacity, the greater the amount of heat generated and the lower the desired temperature of the electrolyte, to avoid overheating during the final charging of the formation process.

Initial charging includes charging the battery first at a low rate and then at a higher rate to oxidize and to reduce lead at the surfaces of the lead metal plates to a preselected intermediate degree.

As used herein and for purposes of this invention a battery is considered to be "100% electrolyte saturated" when the battery plates and separators are initially filled to their capacity with electrolyte, i.e. when the battery is first filled with electrolyte, and there is no free electrolyte present elsewhere in the battery jar or case.

The process makes several important changes from conventional techniques used heretofore. The process is a jar formation process. The fill acid is chilled to preferably about 50 degrees Farenheit or less. An initial electrolyte quantity less than the capacity of the separators and plates, when the separators and plates are 100% saturated, is utilized. The most preferred initial electrolyte quantity is about sixty-seven percent (67%) of the electrolyte saturation capacity of the plates and separators. (Use of less electrolyte than the 100% electrolyte-saturation capacity of the battery plates and separators is referred to as using a "starved" amount of electrolyte.) Electrolyte initial saturation preferably ranges upward from about fifty percent (50%).

Both the chilled acid and the most preferred sixty-seven percent (67%) electrolyte saturation retard dissolution of lead compounds from the plates into the electrolyte. The chilled acid and the most preferred about sixty-seven percent (67%) saturation also allow higher specific gravity electrolyte to be used in the cell. Furthermore, because the starved condition affects electrolyte film continuity, tortuosity of the pore paths through the separators increases significantly over that when the battery is flooded ("flooded" as used herein denoting the battery being at 100% electrolyte saturation) and when the electrolyte is at room temperature or higher. (The "pore paths" are paths through the separator, consisting of connected or communicating open, as opposed to closed, pores in the separator.) Surprisingly, this increased tortuosity apparently prevents growth of lead dendrites that would otherwise grow along the pore paths and short out adjacent electrode plates. Chilling the electrolyte reduces molecular activity and hence reduces solubility of lead compounds in the electrrolyte. Minimal soak time and a specifically selected electrical charging regime increase the probability of successfully forming cells without producing lead dendrites. All of this results in the ability to use higher specific gravity sulfuric acid as compared to conventional processes.

The invention eliminates the need for expensive, labor intensive, tank forming processes.

Surprisingly, batteries formed according to the invention show more initial capacity than identical batteries formed using conventional tank forming processes.

DESCRIPTION OF THE PREFERRED EMBODIMENTS AND BEST MODE KNOWN FOR PRACTICING THE INVENTION

In forming batteries according to the invention, the lead plates in the battery have previously been pasted with lead dioxide in the conventional manner. The paste is used as a binder. There is conventionally a little sulfate in the paste, so lead sulfate is already present in a small amount in the plates.

The preferred glass mat absorbent separators in the batteries which the invention forms are preferably highly porous, having porosity exceeding about ninety-five percent (95%), with the separator pores ranging from about two (2) to about thirty-five (35) microns in diameter.

In practicing the invention, each cell of the battery is preferably initially filled to only about sixty-seven percent (67%) of its electrolyte-saturated capacity with electrolyte acid which has preferably been chilled at least to between about 32 degrees F. and about 50 degrees F. The initial fill electrolyte may be chilled as low as zero (0) degrees F. or colder and in any event is chilled sufficiently that temperature rise due to internal heat generation, from electrolysis during the charging steps of the forming process, is not excessive. If excessive battery temperature rise is permitted, the benefits provided by the chilled electrolyte, specifically the lower solubility of lead sulfate in the electrolyte (which is significant in preventing growth of lead dendrites through the porous glass separators) is lost.

Once this amount of sulfuric acid electrolyte is introduced to the battery cells, specific gravity may preferably be adjusted by addition of more sulfuric acid or water, to make certain that 100% of the required amount of sulfate is present. (The intended use of the battery defines the required amount of sulfate which, in turn, defines the required final specific gravity.) As a practical matter, maximum electrolyte specific gravity is about 1.32—unacceptable corrosion and undesirable plate softening, through precipitation of $PbSO_4$, occur at higher specific gravities.

After each cell has preferably been filled (using chilled sulfuric acid electrolyte) to about sixty-seven percent (67%) of normal electrolyte capacity (where "normal" means 100% electrolyte saturation of plates and separators, as described above), charging current is applied.

One profile forms batteries in five distinct steps. These steps involve charging the battery at fixed amp hour per pound rates in three separate stages at successively increased amp hours per pound, halting charging to add water and/or acid to the cells to produce at least 100% electrolyte saturation and, finally, resuming charging to complete formation. The charging toward the end of the formation process hydrolyzes excess water into hydrogen and oxygen gas so that at the end of formation the battery has about 100% of its electrolyte-saturated capacity.

It is not necessary to halt charging to add the water and/or acid to the cells to produce at least 100% electrolyte saturation; this may be performed while charging continues.

Immediately after formation is complete, vent plugs and strips may be applied to the battery and the battery is ready to be shipped.

The water and/or acid added to the cells after some charging to produce at least 100% electrolyte saturation before resuming charging and completing formation, or added during charging, may or may not be chilled.

The following examples illustrate practice of the invention. In the examples, batteries having absorbent glass mat separators between the plates were formed. The glass mat separators were highly porous, having porosity exceeding about ninety-five percent (95%), with the separator pores ranging from about two (2) to about thirty-five (35) microns in diameter. These glass mat separators were the type used in commercially available lead-acid industrial batteries. The batteries formed as set forth in the examples had positive plates ranging in thickness from about 0.120 to about 0.140 inches prior to forming and negative plates ranging in thickness from about 0.075 to about 0.090 inches prior to forming, with the positive and negative plates separated by about 0.070 inches.

EXAMPLE 1

Six (6) volt, fifty (50) amp-hour lead-acid industrial batteries having absorbent glass mat separators between the plates, having cell compartments with a 100 percent electrolyte saturated capacity of 270 cubic centimeters, were successfully formed.

This formation profile with such 50 amp-hour batteries involved initially placing 180 cubic centimeters of sulfuric acid, having a specific gravity of 1.25 measured at 77 F., chilled to below 40 F., into each battery compartment. Formation, specifically step 1 in the profile set forth below, was initiated within one hour after putting the acid in the batteries. In step 4, 50 cubic cemtimeters of the same 1.25 specific gravity sulfuric acid (with specific gravity measured at 77 F.) were added to each cell compartment and 55 cubic centimeters of water were also added to each cell compartment.

The batteries were initially in a starved electrolyte condition, containing only about sixty-seven percent (67%) of the one hundred percent (100%) absorbed electrolyte capacity of the cells at the start of the formation profile. Water and acid were added to the batteries after some charging, as indicated by the comment to profile step 4.

The formation profile was as follows:

| Profile Step | Time (Hours) | Current (Amps) | Amp. Hrs. | Comment |
|---|---|---|---|---|
| 1 | 3 | 1.5 | 4.5 | Begun within one hour of filling |
| 2 | 10 | 2.9 | 29.0 | |
| 3 | 32 | 3.6 | 115.2 | |
| 4 | As Required | 0.0 | — | Water and acid added to Yield 100% saturation by the end of formation |
| 5 | 75 | 2.9 | 217.5 | |
| Totals: (Cumulative) | 120 | — | 366.2 | |

This formation profile proved suitable for these six (6) volt, fifty (50%) amp-hour batteries.

The relatively short soak time and the chilled sulfuric acid electrolyte helped to control battery temperature rise.

Once forming was completed, the batteries were ready to be used. Unlike with conventional methods, no replacement or reactivation was required. Hence, "forming" actually included initial battery charging. Due to the starved electrolyte condition during steps 1, 2 and 3 of the forming profile, the pores of the separators apparently did not initially fill with electrolyte. In addition, the use of chilled, relatively high specific gravity electrolyte apparently helped to prevent acid depletion within the pores of the separators; this helped prevent dendrite growth. Batteries formed according to this Example 1 did not exhibit evidence of lead dendrite shorting.

EXAMPLE 2

Twelve (12) volt, twenty-five (25) amp-hour lead-acid industrial batteries having absorbent glass mat separators between the plates, having cell compartments with a 100 percent electrolyte saturated capacity of 270 cubic centimeters, were successfully formed.

This formation profile with such 25 amp-hour batteries involved initially placing 180 cubic centimeters of sulfuric acid, having a specific gravity of 1.25 measured at 77 F., chilled to below 40 F., into each battery compartment. Formation, specifically step 1 in the profile set forth below, was initiated within one hour after putting the acid in the batteries. In step 4, 50 cubic centimeters of the same 1.25 specific gravity sulfuric acid (with specific gravity measured at 77 F.) were added to each cell compartment and 55 cubic centimeters of water were also added to each cell compartment.

The batteries were initially in a starved electrolyte condition, containing only about sixty-seven percent (67%) of the one hundred percent (100%) absorbed electrolyte capacity of the cells at the start of the formation profile. Water and acid were added to the batteries after some charging, as indicated by the comment to profile step 4.

The formation profile was as follows:

| Profile Step | Time (Hours) | Current (Amps) | Amp. Hrs | Comment |
|---|---|---|---|---|
| 1 | 3 | 1.0 | 3.0 | Begun within one hour of filling |
| 2 | 10 | 1.4 | 14.0 | |
| 3 | 32 | 1.8 | 57.6 | |
| 4 | — | 0.0 | — | Water and acid added to yield 100% saturation by the end of formation |
| 5 | 75 | 1.45 | 108.8 | |
| Totals: (Cumulative) | 120 | — | 183.4 | |

This formation profile proved suitable for these twelve (12) volt, twenty-five (25) amp-hour batteries with each compartment having electrolyte capacity of about 270 cc at saturation.

The batteries were initially in a starved electrolyte condition, containing only about sixty-seven percent (67%) of the one hundred percent (100%) absorbed electrolyte capacity of the cells at the start of the formation profile. The relatively short soak time of one (1) hour was facilitated by use of the chilled sulfuric acid electrolyte. Water and acid were added to the batteries after some charging, as indicated by the comment to profile step 4.

Once forming was completed, the batteries were ready to be used. Unlike with conventional methods, no replacement or reactivation was required. Hence, "forming" actually included initial battery charging. Due to the starved electrolyte condition during steps 1, 2 and 3 of the forming profile, the pores of the separators apparently did not initially fill with electrolyte. In addition, the use of chilled, relatively high specific gravity electrolyte apparently helped to prevent acid depletion within the pores of the separators; this helped prevent dendrite growth. Batteries formed according to this Example 2 did not exhibit any evidence of lead dendrite shorting.

EXAMPLE 3

Twelve (12) volt, one hundred (100) amp-hour lead-acid industrial batteries having absorbent glass mat separators between the plates, having cell compartments with a 100 percent electrolyte saturated capacity of one thousand fifty (1050) cubic centimeters, were successfully formed.

This formation profile with such 100 amp-hour batteries involved initially placing 700 cubic centimeters of sulfuric acid, having a specific gravity of 1.25 measured at 77 F., chilled to below 40 F., into each battery compartment. Formation, specifically step 1 in the profile set forth below, was initiated within one hour after putting the acid in the batteries. In step 4, 200 cubic centimeters of the same 1.25 specific gravity sulfuric acid (with specific gravity measured at 77 F.) were added to each cell compartment and 255 cubic centimeters of water were also added to each cell compartment.

The batteries were initially in a starved electrolyte condition, containing only about sixty-seven percent (67%) of the one hundred percent (100%) absorbed electrolyte capacity of the cells at the start of the formation profile. Water and acid were added to the batteries after some charging, as indicated by the comment to profile step 4.

The formation profile was as follows:

| Profile Step | Time (Hours) | Current (Amps) | Amps. Hrs. | Comment |
|---|---|---|---|---|
| 1 | 3 | 3.3 | 4.5 | Begun within one hour of filling |
| 2 | 10 | 6.65 | 66.5 | |
| 3 | 32 | 8.05 | 257.6 | |
| 4 | — | 0.0 | — | Water and acid added to yield 100% saturation by the end of formation |
| 5 | 123 | 4.05 | 498.2 | |
| Totals: (Cumulative) | 168 | — | 832.2 | |

This formation profile proved suitable for the twelve (12) volt, one hundred (100) amp-hour batteries with cell compartments having electrolyte capacity of 1050 cc at saturation.

Once forming was completed, the batteries were ready to be used. Unlike with conventional methods, no replacement or reactivation was required. Hence, "forming" actually included initial battery charging.

Due to the starved electrolyte condition during steps 1, 2 and 3 of the forming profile, the pores of the separators apparently did not initially fill with electrolyte. In addition, the use of chilled, relatively high specific gravity electrolyte apparently helped to prevent acid depletion within the pores of the separators; this helped prevent dendrite growth. Batteries formed according to this Example 3 did not exhibit any evidence of lead dendrite shorting.

EXAMPLE 4

Six (6) volt, two hundred (200) amp-hour lead-acid industrial batteries having absorbent glass mat separators between the plates, having cell compartments with 100 percent electrolyte saturated capacity of 1050 cubic centimeters, were successfully formed. Water and acid were added to the batteries after some charging, as indicated by the comment to profile step 4.

The formation profile was as follows:

| Profile Step | Time (Hours) | Current (Amps) | Amp. Hrs. | Comment |
|---|---|---|---|---|
| 1 | 3 | 6.6 | 19.8 | Begun within one hour of filling |
| 2 | 10 | 13.3 | 133.0 | |
| 3 | 32 | 16.1 | 515.2 | |
| 4 | — | 0.0 | — | Water and acid added to yield close to 100% saturation by the end of formation |
| 5 | 123 | 8.1 | 996.3 | |
| Totals: (Cumulative) | 168 | — | 1664.3 | |

This formation profile proved suitable for the six (6) volt, two hundred (200) amp-hour batteries with cell compartments having electrolyte capacity of about 1050 cc at saturation.

Using this formation profile with such 200 amp-hour batteries involved initially placing 700 cubic centimeters of sulfuric acid, having a specific gravity of 1.25 measured at 77 F., chilled to below 40 F. into each cell compartment. Formation, specifically step 1 in the above-outlined profile, was initiated within one hour after putting the acid in the batteries. In step 4, 200 cubic centimeters of the same 1.25 specific gravity sulfuric acid (with specific gravity measured at 77 F.) were added to each cell compartment and 255 cubic centimeters of water were also added to each cell compartment.

The batteries were initially in a starved electrolyte condition, containing only about sixty-seven percent (67%) of the one hundred percent (100%) absorbed electrolyte capacity of the cells at the start of the formation profile. The relatively short soak time of one (1) hour was facilitated by use of the chilled sulfuric acid electrolyte.

Once forming was completed, the batteries were ready to be used. Unlike with conventional methods, no replacement or reactivation was required. Hence, "forming" actually included initial battery charging.

Due to the starved electrolyte condition during steps 1, 2 and 3 of the forming profile, the pores of the separators apparently did not initially fill with electrolyte. In addition, the use of chilled, relatively high specific gravity electrolyte apparently helped to prevent acid depletion within the pores of the separators; this helped prevent dendrite growth. Batteries formed according to this Example 4 did not exhibit any evidence of lead dendrite shorting.

EXAMPLE 5

One hundred (100) six (6) volt, two hundred (200) amp-hour lead-acid industrial batteries, having absorbent glass mat separators between the plates and having cell compartments with 100 percent electrolyte-saturated capacity of 1050 cubic centimeters, were successfully formed using the formaton profile set forth below.

This formation profile with such 200 amp-hour batteries involved initially placing 707 cubic centimeters of sulfuric acid, having a specific gravity of 1.25 measured at 77 F., chilled to 18 F., into each battery compartment. Formation, specifically step 1 in the below-outlined profile, was initiated within one (1) hour after introducing the acid into the batteries. In step 4, 200 cubic centimeters of the same 1.25 specific gravity sulfuric acid (with specific gravity measured at 77 F) was added to each compartment and 255 cubic centimeters of water were also added to each compartment.

The batteries were initially in a starved electrolyte condition, containing only about sixty-seven percent (67%) of the one hundred percent (100%) absorbed electrolyte capacity of the cells at the start of the formation profile.

The formation profile was as follows:

| Profile Step | Time (Hours) | Current (Amps) | Amp. Hrs. | Comment |
|---|---|---|---|---|
| 1 | 3 | 6.6 | 19.8 | Begun within one hour of filling |
| 2 | 10 | 13.3 | 133.0 | |
| 3 | 32 | 16.1 | 515.2 | |
| 4 | As required | 0.0 | — | Water and acid added to yield close to 100% saturation by the end of formation. |
| 5 | 123 | 8.1 | 996.3 | |
| Cumulative Totals: | 168 | — | 1664.3 | |

This formation profile proved suitable for these six (6) volt, two hundred (200) amp-hour batteries.

The relatively short soak time and the chilled sulfuric acid electrolyte helped to control battery temperature rise.

Once forming was completed, the batteries were ready to be used. Unlike with conventional methods, no replacement or reactivation was required. Hence, "forming" actually included initial battery charging.

Due to the starved electrolyte condition during steps 1, 2 and 3 of the profile, the pores of the separators apparently did not initially fill with electrolyte. In addition, the use of a relatively high specific gravity electrolyte apparently helped to prevent acid depletion within the pores of the separators and hence helped prevent dendrite growth.

Of the one hundred (100) batteries sought to be formed according to this profile, ninety-nine (99) apparently formed successfully and proved acceptable.

After formation, the 100 batteries were tested by being discharged over an eight hour period using a controlled current discharging device. The number of amp-hours provided over the eight hour discharge period was measured. All but one of the batteries provided in excess of ninety percent (90) of the rated amp-hour capacity over the eight hour discharge period. Two of the batteries provided in excess of ninety percent, but less than one hundred percent, of the rated amp-hours over the eight hour discharge period. The ninety-seven (97) remaining batteries all provided in excess of one hundred percent of their rated amp-hours over the eight hour discharge period. (The battery industry uses acceptance criteria under which batteries exhibiting less than 100% of rated capacity on initial discharge—for example 90% or 95% of rated capacity on initial discharge—are considered acceptable. This is because the phenomenon whereby batteries initially gain capacity during use is well known—battery manufacturers and their customers depend on this phenomenon when selling, purchasing and specifying batteries.)

EXAMPLE 6

Seventy-five (75) six (6) volt, two hundred (200) amp-hour lead-acid industrial batteries, having absorbent glass mat separators between the plates and having cell compartments with 100 percent electrolyte saturated capacity of 1050 cubic centimeters, were successfully formed using the formation profile set forth below.

This formation profile with such 200 amp-hour batteries involved initially placing 707 cubic centimeters of sulfuric acid, having a specific gravity of 1.25 measured at 77 F., chilled to 33–35 F. into each battery compartment. Formation, specifically step 1 in the profile below, was initiated within one hour after introducing the acid into the batteries. In step 4, 200 cubic centimeters of the same 1.25 specific gravity sulfuric acid (with specific gravity measured at 77 F.) were added to each cell compartment and 255 cubic centimeters of water were also added to each cell compartment.

The batteries were initially in a starved electrolyte condition, containing only about sixty-seven percent (67%) of the one hundred percent (100%) absorbed electrolyte capacity of the cells at the start of the formation profile.

The formation profile was as follows:

| Profile Step | Time (Hours) | Current (Amps) | Amp. Hrs. | Comment |
|---|---|---|---|---|
| 1 | 3 | 6.6 | 19.8 | Begun within one hour of filling |
| 2 | 10 | 13.3 | 133.0 | |
| 3 | 32 | 16.1 | 515.2 | |
| 4 | As required | 0.0 | — | Water and acid added to yield 100% saturation by the end of formation. |
| 5 | 123 | 8.1 | 996.3 | |
| Cumulative Totals: | 168 | — | 1664.3 | |

This formation profile proved suitable for these six (6) volt, two hundred (200) amp-hour batteries.

The relatively short soak time and the chilled sulfuric acid electrolyte helped to control battery temperature rise.

Once forming was completed, the batteries were ready to be used. Unlike with conventional methods, no replacement or reactivation was required. Hence, "forming" actually included initial battery charging.

Due to the starved electrolyte condition during steps 1, 2 and 3 of the profile, the pores of the separators apparently did not initially fill with electrolyte. In addition, the use of a relatively high specific gravity electrolyte apparently helped to prevent acid depletion within the pores of the separators and hence helped prevent dendrite growth. Of the seventy-five (75) batteries sought to be formed according to this profile, seventy-four (74) apparently formed successfully and proved acceptable.

After formation, the 75 batteries were tested by being discharged over an eight hour period using a controlled current discharging device. The number of amp-hours provided over the eight hour discharge period was measured. All but one of the batteries provided in excess of ninety percent (90%) of the rated amp-hour capacity over the eight hour discharge period. Eight of the batteries provided in excess of ninety percent (90%), but less than one hundred percent (100%), of the rated amp-hours over the eight hour discharge period. The sixty-six remaining batteries all provided in excess of one hundred percent (100%) of their rated amp-hours over the eight hour discharge period.

EXAMPLE 7

Ninety (90) twelve (12) volt, one hundred (100) amp-hour lead-acid industrial batteries, having absorbent glass mat separators between the plates and having cell compartments with 100 percent electrolyte-saturated capacity of 1050 cubic centimeters, were successfully formed using the formation profile set forth below.

This formation profile with such 100 amp-hour batteries involved initially placing 707 cubic centimeters of sulfuric acid, having a specific gravity of 1.25 measured at 77 F., chilled to 31 F. into each battery compartment. Formation, specifically step 1 in the below-outlined profile, was initiated within one hour after introducing the acid in the batteries. In step 4, 200 cubic centimeters of the same 1.25 specific gravity sulfuric acid (with specific gravity measured at 77 F.) were added to each cell compartment and 255 cubic centimeters of water were also added to each cell compartment.

The batteries were initially in a starved electrolyte condition, containing only about sixty-seven percent (67%) of the one hundred percent (100%) absorbed electrolyte capacity of the cells at the start of the formation profile.

The formation profile was as follows:

| Profile Step | Time (Hours) | Current (Amps) | Amp. Hrs. | Comment |
|---|---|---|---|---|
| 1 | 3 | 3.3 | 4.5 | Begun within one hour of filling |
| 2 | 10 | 6.65 | 66.5 | |
| 3 | 32 | 8.05 | 257.6 | |
| 4 | As Required | 0.0 | — | Water and acid added to yield 100% saturation by the end of formation |
| 5 | 123 | 4.05 | 498.2 | |
| Totals: (Cumulative) | 168 | — | 832.2 | |

This formation profile proved suitable for these twelve (12) volt, one hundred (100) amp-hour batteries.

The relatively short soak time and the chilled sulfuric acid electrolyte helped to control battery temperature rise.

Once forming was completed, the batteries were ready to be used. Unlike with conventional methods, no replacement or reactivation was required. Hence, "forming" actually included initial battery charging.

Due to the starved electrolyte condition during profile steps 1, 2 and 3, the pores of the separators apparently did not initially fill with elecgrolyte. In addition, the use of a relatively high specific gravity electrolyte apparently helped to prevent acid depletion within the pores of the separators and hence helped prevent dendrite growth.

Of the ninety (90) batteries sought to be formed according to this profile, all ninety apparently formed successfully and proved acceptable.

After formation, the 90 batteries were tested by being discharged over an eight hour period using a controlled current discharging device. The number of amp-hours provided over the eight hour discharge period was measured. All of the batteries provided in excess of ninety percent of their rate amp-hour capacity over the eight hour discharge period. Seven of the batteries provided in excess of ninety percent, but less than one hundred prcent, of the rated amp-hours over the eight hour discharge period. The eight-three (83) remaining batteries all provided in excess of one hundred percent (100%) of their rated amp-hours over the eight hour discharge period.

EXAMPLE 8

Sixty (60) twelve (12) volt, twenty-five (25) amp-hour lead-acid industrial batteries, having absorbent glass mat separators between the plates and having cell compartments with 100 percent electrolyte saturated capacity of 270 cubic centimeters, were successfully formed using the formation profile set forth below.

This formation profile with such 25 amp-hour batteries involved initially placing 186 cubic centimeters of sulfuric acid, having a specific gravity of 1.25 measured at 77 F, chilled to 14 F into each battery compartment. Formation, specifically step 1 in the below-outlined profile, was initiated within one hour after introducing the acid into the batteries. In step 4, 50 cubic centimeters of the same 1.25 specific gravity sulfuric acid (with specific gravity measured at 77 F) were added to each cell compartment and 55 cubic centimeters of water were also added to each cell compartment.

The batteries were initially in a starved electrolyte condition, containing only about sixty-nine percent (69%) of the one hundred percent (100%) absorbed electrolyte capacity of the cells at the start of the formation profile.

The formation profile was as follows:

| Profile step | Time (Hours) | Current (Amps) | Amp. hrs. | Comment |
|---|---|---|---|---|
| 1 | 3 | 1.0 | 3.0 | Begun within one hour of filling |
| 2 | 10 | 1.4 | 14.0 | |
| 3 | 32 | 1.8 | 57.6 | |
| 4 | As Required | 0.0 | — | Water and acid added to yield 100% saturation by the end of formation |
| 5 | 75 | 1.45 | 108.8 | |
| Totals: (Cumula- | 120 | — | 183.4 | |

| Profile step | Time (Hours) | Current (Amps) | Amp. hrs. | Comment |
|---|---|---|---|---|
| tive) | | | | |

This formation profile proved suitable for these twelve (12) volt, twenty-five (25) amp-hour batteries.

The relatively short soak time and the chilled sulfuric acid electrolyte helped to control battery temperature rise.

Once forming was completed, the batteries were ready to be used. Unlike with conventional methods, no replacement or reactivation was required. Hence, "forming" actually included initial battery charging.

Due to the starved electrolyte condition during profile steps 1, 2 and 3, the pores of the separators apparently did not initially fill with electrolyte. In addition, the use of a relatively high specific gravity electrolyte apparently helped to prevent acid depletion witin the pores of the separators and hence helped prevent dendrite growth.

Of the sixty (60) batteries sought to be formed according to this profile, fifty-eight (58) apparently formed successfully and proved acceptable.

After formation, the 60 batteries were tested by being discharged over an eight hour period using a controlled current discharging device. The number of amp-hours provided over the eight hour discharge period was measured. All but two of the batteries provided in excess of ninety percent of the rated amp-hour capacity over the eight hour discharge period. Five of the batteries provided in excess of ninety percent, but less than one hundred percent, of the rated amp-hours over the eight hour discharge period. The fifty-three remaining batteries all provided in excess of one hundred percent (100%) of their rated amp-hours over the eight hour discharge period.

EXAMPLE 9

Sixty (60) twelve (12) volt, twenty five (25) amp-hour lead-acid industrial batteries, having absorbent glass mat separators between the plates and having cell compartments with 100 percent electrolyte saturated capacity of 270 cubic centimeters, were successfully formed using the formation profile set forth below.

This formation profile with such 25 amp-hour batteries involved initially placing 184 cubic centimeters of sulfuric acid, having a specific gravity of 1.25 measured at 77 F, chilled to 0 degrees F into each battery compartment. Formation, specifically step 1 in the profile, was initiated within one hour after introducing the acid into the batteries. In step 4, 50 cubic centimeters of the same 1.25 specific gravity sulfuric acid (with specific gravity measured at 77 F) were added to each cell compartment and 55 cubic centimeters of water were also added to each cell compartment.

The batteries were initially in a starved electrolyte condition, containing only about sixty-eight (68%) of the one hundred percent (100%) absorbed electrolyte capacity of the cells at the start of the formation profile.

The formation profile was as follows:

| Profile Step | Time (Hours) | Current (Amps) | Amp. Hrs. | Comment |
|---|---|---|---|---|
| 1 | 3 | 1.0 | 3.0 | Begun within one hour of filling |
| 2 | 10 | 1.4 | 14.0 | |
| 3 | 32 | 1.8 | 57.6 | |
| 4 | As Required | 0.0 | — | Water and acid added to yield 100% saturation by the end of formation |
| 5 | 75 | 1.45 | 108.8 | |
| Totals: (Cumulative) | 120 | — | 183.4 | |

This formation profile proved suitable for these twelve (12) volt, twenty-five (25) amp-hour batteries.

The relatively short soak time and the cilled sulfuric acid electrolyte helped to controll battery temperature rise.

Once forming was completed, the batteries were ready to be used. Unlike with conventional methods, no replacement or reactivation was required. Hence, "forming" actually included initial battery charging.

Due to the starved electrolyte condition during profile steps 1, 2 and 3, the pores of the separators apparently did not initially fill with electrolyte. In addition, the use of a relatively high specific gravity electrolyte apparently helped to prevent acid depletion within the pores of the separators and hence helped prevent dendrite growth.

Of the sixty (60) batteries formed according to this profile, fifty-five (55) apparently formed successfully and proved acceptable.

After formation, the 60 batteries were tested by being discharged over an eight hour period using a controlled current discharging device. The number of amp-hours provided over the eight hour discharge period was measured. All but five (5) of the batteries provided in excess of ninety percent (90%) of the rated amp-hour capacity over the eight hour discharge period. Three (3) of the batteries provided in excess of ninety percent (90%), but less than one hundred percent (100%), of the rated amp-hours over the eight hour discharge period. The fifty-two remaining batteries all provided in excess of one hundred percent (100%) of their rated amp-hours over the eight hour discharge period.

EXAMPLE 10

Sixty (60) six (6) volt, fifty (50) amp-hour lead-acid industrial batteries, having absorbent glass mat separators between the plates and having cell compartments with 100 percent electrolyte saturated capacity of 270 cubic centimeters, were successfully formed using the formation profile set forth below.

This formation profile with such 50 amp-hour batteries involved initially placing 183 cubic centimeters of sulfuric acid, having a specific gravity of 1.25 measured at 77 F, chilled to 5 degrees F into each battery compartment. Formation, specifically step 1 in the profile, was initiated within one hour after introducing the acid into the batteries. In step 4, 50 cubic centimeters of the same 1.25 specific gravity sulfuric acid (with specific gravity measured at 77 F) were added to each cell compartment and 55 cubic centimeters of water were also added to each cell compartment.

The batteries were initially in a starved electrolyte condition, containing only about sixty-eight percent (68%) of the one hundred percent (100%) absorbed electrolyte capacity of the cells at the start of the formation profile.

The formation profile was as follows:

| Profile Step | Time (Hours) | Current (Amps) | Amp. Hrs. | Comment |
|---|---|---|---|---|
| 1 | 3 | 1.5 | 4.5 | Begun within one hour of filling |
| 2 | 10 | 2.9 | 29.0 | |
| 3 | 32 | 3.6 | 115.2 | |
| 4 | As Required | 0.0 | — | Water and acid added to yield 100% saturation by the end of formation |
| 5 | 75 | 2.9 | 217.5 | |
| Totals: (Cumulative) | 120 | — | 366.2 | |

This formation profile proved suitable for these six (6) volt, fifty (50) amp-hour batteries.

The relatively short soak time and the chilled sulfuric acid electrolyte helped to control battery temperature rise.

Once forming was completed, the batteries were ready to be used. Unlike with conventional methods, no replacement or reactivation was required. Hence, "forming" actually included initial battery charging.

Due to the starved electrolyte condition during steps 1, 2 and 3 of the profile, the pores of the separators apparently did not initially fill with electrolyte. In addition, the use of a relatively high specific gravity electrolyte apparently helped to prevent acid depletion within the pores of the separators and hence helped prevent dendrite growth.

Of the sixty (60) batteries sought to be formed according to this profile, fifty-eight (58) apparently formed successfully and proved acceptable.

After formation, the 60 batteries were tested by being discharged over an eight hour period using a controlled current discharging device. The number of amp-hours provided over the eight hour discharge period was measured. All but two of the batteries provided in excess of ninety percent (90%) of the rated amp-hour capacity over the eight hour discharge period. One of the batteries provided in excess of ninety percent (90%), but less than one hundred percent (100%), of the rated amp-hours over the eight hour discharge period. The fifty-seven remaining batteries all provided in excess of one hundred percent (100%) of their rated amp-hours over the eight hour discharge period.

Tests have shown the importance of using both a starved amount of electrolyte and chilled electrolyte in forming batteries according to the invention. When batteries are formed with the electrolyte at too high a temperature and/or using other than a starved amount of electrolyte, dendrite shorting occurs, Test 1

Two six volt lead-acid industrial batteries, having 200 amp-hour rated capacities, having cell compartments with 100% electrolyte-saturated capacities of 1,050 cubic centimeters, were formed and tested using the formation profile set forth below. (These batteries were similar to the batteries formed as set forth in Example 4, above.) The 1,050 cubic centimeter electrolyte capacity cell compartments (at 100% electrolyte saturation) were initially filled with 900 cubic centimeters of liquid sulfuric acid electrolyte, having specific gravity of 1.224 (measured at 77 degrees F). Thus, the cell compartments initially contained sulfuric acid electrolyte amounting to eighty-six percent (86%) of electrolyte-saturation capacity, as that term is defined above. The sulfuric acid electrolyte was chilled to 50 degrees F before being added to the cell compartments.

| Profile Step | Time (Hours) | Current (Amps) | Comment |
|---|---|---|---|
| 1 | 3 | 9 | |
| 2 | 20 | 23.4 | |
| 3 | 73 | 15.4 | 100 cc H$_2$SO$_4$ Added |
| Total (Cumulative) | 96 | — | |

During step 3, 100 cc of liquid sulfuric acid, having the same specific gravity (measured at 77 degrees F) as the liquid sulfuric acid electrolyte initially placed in the cell compartments, were added to each cell compartment.

Of the two batteries sought to be formed according to this profile, only one formed successfully and proved acceptable. Shorting was apparent in the other battery during formation with shorting occurring early during step 2.

After formation, the two batteries were tested by being discharged over an eight hour period using a controlled current discharging device. The number of amp-hours provided over the eight hour discharge period was measured. The battery which had exhibited shorting provided only 80.0% of rated amp-hour capacity over the eight hour discharge period. The second battery did not exhibit dendrite shorting and provided 93.5% of the rated eight hour discharge capacity.

These two batteries were formed using an initial amount of electrolyte equal to eighty-six percent (86%) of the battery electrolyte-saturation capacity. Only one battery proved acceptable; the other provided only 80% of the rated amp-hour capacity during discharge and exhibited shorting, which necessarily leads to an unacceptably short service life. The battery which exhibited 93.5% of rated capacity on initial discharge was considered acceptable (because of the above-noted phenomenon whereby batteries typically initially gain capacity during use). Thus, use of moderately chilled electrolyte in only a slightly starved amount did not yield entirely satisfactory results.

Test 2

Two six volt lead-acid industrial batteries having 200 amp-hour rated capacities having cell compartments with 100% electrolyte-saturated capacities of 1,050 cubic centimeters were formed and tested using the formation profile set forth below. (These batteries were similar to the batteries in Example 4, above.) The 1,050 cubic centimeter electrolyte capacity cell compartments (at 100% electrolyte-saturation ) were initially filled with 900 cubic centimeters of liquid sulfuric acid electrolyte, having specific gravity of 1.247 (measured at 77 degrees F). Thus, the cell compartments initially contained sulfuric acid electrolyte amounting to eighty-six percent (86%) of electrolyte-saturation capacity, as that term is defined above. The sulfuric acid electrolyte was chilled to 32 degrees F before being added to the cell compartments.

| Profile Step | Time (Hours) | Current (Amps) | Comment |
| --- | --- | --- | --- |
| 1 | 3 | 10 | |
| 2 | 25 | 25.0 | |
| 3 | 44 | 15.4 | 220 cc H20 Added |
| Total (Cumulative) | 72 | — | |

During step 3, 220 cc of water was aded to each cell compartment.

Shorting was apparent along the grid members of both batteries in all compartments during formation with shorting occurring early during step 2.

After formation, the two batteries were tested by being discharged over an eight hour period using a controlled current discharging device. The number of amp-hours provided over the eight hour discharge period was measured. One of the batteries provided 88.8% of the rated amp hour capacity but the other battery provided only 27.4% of the rated amp-hour capacity over the eight hour discharge period.

These two batteries were formed using chilled, lower temperature electrolyte, with the initial amount of electrolyte equal to eighty-six percent (86%) of the battery electrolyte-saturation capacity. Due to the dendrite shorting, neither of these batteries could be expected to have a satisfactory service life. Thus, use of further chilled, i.e. lower temperature, electrolyte, in only a slightly starved amount, did not yield satisfactory results.

Test 3

Two six volt lead-acid batteries having 200 amp-hour rated capacities, having cell compartments with 100% electrolyte-saturated capacities of 1,050 cubic centimeters, were formed and tested using the formation profile set forth below. (These batteries were similar to the batteries in Example 4, above.) The 1,050 cubic centimeter electrolyte capacity cell compartments (at 100% electrolyte saturation) were initialy filled with 1000 cubic centimeters of liquid sulfuric acid electrolyte, having specific gravity of 1.224 measured at 77 degrees F. Thus, the cell compartments initially contained sulfuric acid electrolyte amounting to almost one hundred percent (100%) of cell compartment electrolyte-saturated capacity, as that term is defined above. The sulfuric acid electrolyte was not chilled before being introduced into the cell compartments.

| Profile Step | Time (Hours) | Current (Amps) | Comment |
| --- | --- | --- | --- |
| 1 | 3 | 11.4 | |
| 2 | 31 | 21.1 | |
| 3 | 86 | 11.4 | 170 cc H20 Added |
| Total (Cumulative) | 120 | — | |

During step 3, 170 cc of water were added to each cell compartment.

Shorting was apparent along the grid members of one battery in all compartments during the formation process. Of the two batteries sought to be formed according to this profile, only one, the non-shorting battery, formed successfully.

After formation, the two batteries were tested by being discharged over an eight hour period using a controlled current discharging device. The number of amp-hours provided over the eight hour discharge period was measured. One of the batteries, which reached a maximum temperature of 125.8 degrees F during formation and exhibited no shorting, provided 107.8% of rated amp-hour capacity over the eight hour discharge period. The second battery, which exhibited dendritic shorting, provided an insignificant number of amp-hours over the eight hour discharge period. Thus, use of an essentially non-starved amount of room temperature electrolyte yielded only one satisfactory battery; the remaining battery was useless.

Test 4

Two six volt lead-acid batteries having 50 amp-hour rated capacities, having cell compartments with normal, 100% electrolyte-saturated capacities of 270 cubic centimeters, were formed and tested using the formation profile set forth below. (These batteries were similar to the batteries in Example 1, above.) The 270 cubic centimeter electrolyte capacity cell compartments (at 100% electrolyte saturation) were initially filled with 257 cubic centimeters of liquid sulfuric acid electrolyte, having specific gravity of 1.224 (measured at 77 degrees F.). Thus, the cell compartments initially contained sulfuric acid electrolyte amounting to ninety percent (90%) of cell compartment electrolyte saturated capacity, as that term is defined above. The sulfuric acid electrolyte was chilled to 32 degrees F. before being added to the cell compartments.

| Profile Step | Time (Hours) | Current (Amps) | Comment |
| --- | --- | --- | --- |
| 1 | 3 | 2.5 | |
| 2 | 31 | 4.6 | |
| 3 | 86 | 2.5 | 35 cc H20 Added |
| Total (Cumulative) | 120 | | |

During step 3, 35 cc of water were added to each cell compartment.

Of the two batteries sought to be formed according to this profile, both formed successfully and proved acceptable. No shorting or incipient shorting was apparent in either of the batteries during the formation process. After formation, the two batteries were tested by being discharged over an eight hour period using a controlled current discharging device and measuring the number of amp-hours provided over the eight hour discharge period. While being so-discharged, the battery amp-hours provided were 103.0% of the rated amp-hour capacity, over the eight hour discharge period. Thus, use of a highly chilled electrolyte in a slightly starved amount yielded two satisfactory batteries.

Test 5

Two six volt lead-acid batteries having 50 amp-hour rated capacities, having cell compartments with normal, 100% electrolyte-saturated capacities of 270 cubic centimeters, were formed and tested using the formation profile set forth below. (These batteries were similar to the batteries in Example 1, above.) The 270 cubic centimeter electrolyte capacity cell compartments (at 100% electrolyte saturation) were initially filled with 257 cubic centimeters of liquid sulfuric acid electrolyte, having specific gravity of 1.224 (measured at 77 degrees F.). Thus, the cell compartments initially contained sulfuric acid electrolyte amounting to ninety percent (90%) of cell compartment electrolyte saturated capacity, as that term is defined above. The sulfuric acid electrolyte was chilled to 14 degrees F. before being added to the cell compartments.

| Profile Step | Time (Hours) | Current (Amps) | Comment |
| --- | --- | --- | --- |
| 1 | 3 | 2.5 | |
| 2 | 31 | 4.6 | |
| 3 | 86 | 2.5 | 35 cc H$_2$0 Added |
| Total (Cumulative) | 120 | | |

During step 3, 35 cc of water were added to each cell compartment.

Of the two batteries sought to be formed according to this profile, only one apparently formed successfully. No shorting or incipient shorting was apparent in the one successfully produced battery during the formation process. The other battery exhibited shorting along the grid members in four compartments. The shorting began early in profile step 2. Thus, using highly chilled electrolyte in only a slightly starved amount yielded only one apparently satisfactory battery of the two sought to be produced.

Test 6

Two six volt lead-acid batteries having 50 amp-hour rated capacities, having cell compartments with normal, 100% electrolyte-saturated capacities of 270 cubic centimeters, were formed and tested using the formation profile set forth below. (These batteries were similar to the batteries in Example 1, above.) The 270 cubic centimeter electrolyte capacity cell compartments (at 100% electrolyte saturation) were initially filled with 257 cubic centimeters of liquid sulfuric acid electrolyte, having specific gravity of 1.224 (measured at 77 degrees F.). Thus, the cell compartments initially contained sulfuric acid electrolyte amounting to ninety percent (90%) of cell compartment electrolyte saturated capacity, as that term is defined above. The acid placed in the cell compartments was at 77 degrees F. when added to the cell compartments.

| Profile Step | Time (Hours) | Current (Amps) | Comments |
| --- | --- | --- | --- |
| 1 | 37 | 2.0 | |
| 2 | 83 | 3.5 | 35 cc H20 added |
| Total (Cumulative) | 120 | — | |

During step 2, 35 cc of water were added to each cell compartment.

Of the two batteries sought to be formed according to this profile, both apparently formed successfully and proved acceptable. However, one compartment of one of the batteries exhibited what appeared to be the start of a dendrite, of pinhead size, growing through the first separator.

After formation, the two batteries were tested by being discharged over an eight hour period using a controlled current discharging device and measuring the number of amp-hours provided over the eight hour discharge period. While being so-discharged the batteries provided amp-hours amounting to 103.8% of the rated amp-hour capacity, over the eight hour discharge period. Thus, use of non-chilled electrolyte in a only slightly starved amount yielded two batteries which initially operated successfully but whose life expectancy may not be satisfactory, based on observed initial growth of a dendrite.

Test 7

Four six volt lead-acid batteries having 50 amp-hour rated capacities, having cell compartments with normal, 100% electrolyte-saturated capacities of 270 cubic centimeters, were formed and tested using the formation profile set forth below. (These batteries were similar to the batteries in Example 1, above.) The 270 cubic centimeter electrolyte capacity cell compartments (at 100% electrolyte saturation) were initially filled with 257 cubic centimeters of liquid sulfuric acid electrolyte, having specific gravity of 1.224 (measured at 77 degrees F.). Thus, the cell compartments initially contained sulfuric acid electrolytic amounting to ninety percent (90%) of cell compartment electrolyte saturated capacity, as that term is defined above. The acid was at 77 degrees F. when added to the cell compartments.

| Profile Step | Time (Hours) | Current (Amps) | Comment |
| --- | --- | --- | --- |
| 1 | 37 | 2.0 | |
| 2 | 83 | 3.5 | 40 cc H20 added |
| Total (Cumulative) | 120 | — | |

During step 2, 40 cc of water were added to each cell compartment.

Of the four batteries sought to be formed according to this profile, only one apparently formed successfully. In two of the four batteries, shorting was apparent during the formation process along the grids; one of these batteries failed just after the start of the formation process. Of the two batteries not exhibiting any shorting during formation, one exhibited erratic voltage readings after formation. Thus, use of non-chilled electrolyte in only a slightly starved amount resulted in only one apparently acceptable battery out of four.

The following is claimed:

1. A method for in situ forming a lead-acid battery having an electrolyte-absorbent plate separator to produce lead and lead dioxide surfacing of lead metal plates on respective sides of said separator, for electrochemical reaction between said plates and resultant electrical energy production by said battery, comprising the steps of:
   a. cooling a supply of lead-acid battery electrolyte to below room temperature;
   b. introducing into the battery a quantity of said cooled lead-acid battery electrolyte less than the one hundred percent electrolyte-saturated capacity of said plates and said separators;
   c. charging said battery to oxidize and to reduce lead at the surfaces of respective plates to a preselected intermediate degree;
   d. filling said battery with water and/or acid sufficiently to provide at least the one hundred percent electrolyte-saturated capacity of said plates and separators; and
   e. further charging said battery to respectively further oxidize and reduce lead at said respective plates to a preselected degree defining a fully charged state of said battery.

2. The method of claim 1 wherein said cooled lead-acid battery electrolyte has a relatively high specific gravity at room temperature.

3. The method of claim 2 wherein said specific gravity of said cooled lead-acid battery electrolyte is about 1.32 at room temperature.

4. The method of claim 1 wherein said electrolyte introduced into said battery is between about 50% and about 90% of battery plate and separator 100% electrolyte-saturated capacity.

5. The method of claim 4 wherein said electrolyte introduced into said battery is about two-thirds of battery plate and separator 100% electrolyte-saturated capacity.

6. A method for preventing lead-dendrite shorting of adjacent lead metal plates during battery forming due to lead dendrite growth therebetween through electrolyte-absorbent separators between said adjacent plates while in situ forming said lead-acid battery, comprising:
   a. cooling a supply of sulfuric acid to below room temperature;
   b. introducing into the battery a quantity of said cooled sulfuric acid less than battery one hundred percent electrolyte-saturated capacity; and
   c. charging said battery to a preselected degree defining a fully charged state.

7. The method of claim 1 wherein said electrolyte is cooled below about 50 degrees F. before being initially introduced into said battery.

8. The method of claim 7 wherein said electrolyte is cooled to between about 0 and about 50 degrees F.

9. The method of claim 8 wherein said electrolyte is cooled no lower than about −20 degrees F.

10. The method of claim 2 wherein said electrolyte specific gravity at room temperature is no greater than about 1.32.

11. The method of claim 10 wherein said specific gravity at room temperature is sufficient to provide adequate lead sulfate to produce additional lead and lead dioxide surfacing of said lead metal battery plates according to rated capacity of the battery.

12. The method of claim 1 wherein said initial charging comprises charging said battery initially at a low rate and then at a higher rate to oxidize and to reduce lead at the surfaces of respective plates to a preselected intermediate degree.

13. The method of claim 1 wherein said filling with water and/or acid is performed while charging.

14. The method of claim 1 wherein
   (a) said amount of acid and/or water filled into said battery excedes the amount required to provide one hundred percent electrolyte-saturated capacity of said plates and separators; and
   (b) said further charging hydrolyzes any excess water and thereby provides said one hundred percent electrolyte-saturated capacity of electrolyte in said plates and separators.

15. A method for preventing lead dendrite shorting of relatively closely spaced adjacent lead metal plates during battery forming due to lead dendrite growth through liquid electrolyte-absorbent porous separators between said adjacent plates, said separators having up to 95% of separator surface area defined by pores of between about 2 to about 35 microns diameter, while in situ forming said battery to produce additional lead and lead dioxide surfacing of said plates on respective sides of said separators, for electrochemical reaction between said adjacent lead metal plates and resultant electrical energy production by said battery, comprising the steps of:
   a. cooling relatively high specific gravity lead-acid battery electrolyte to a temperature of between about 0 degrees F. and about 50 degrees F.;
   b. introducing into the battery said cooled lead-acid battery electrolyte, having a specific gravity of up to about 1.32 and in any event high enough to provide adequate lead sulfate to produce sufficient additional lead and lead dioxide surfacing of said plates according to rated capacity of the battery, in an amount equal to about two-thids of the electrolyte capacity of said battery plates and separators;
   c. permitting said cooled electrolyte to react with said lead metal plates and to inhabit said porous separators;
   d. charging said battery initially at a low rate and then at a higher rate to respectively oxidize and reduce lead at said plates to a preselected intermediate degree;
   e. filling said battery with water and/or acid thereby occupying said battery with at least the one hundred percent electrolyte-saturated capacity of said battery plates and separators; and
   f. further charging said battery to respectively further oxidize and reduce lead at said respective plates to a preselected final degree defining a fully charged state of said battery.

16. A method for preventing lead-dendrite shorting of adjacent lead metal plates during battery forming due to lead dendrite growth therebetween through electrolyte-absorbent separators between said adjacent plates while in situ forming said lead-acid battery, comprising:
   a. cooling a supply of sulfuric acid to below room temperature;
   b. introducing into the battery a quantity of said cooled sulfuric acid less than battery one hundred percent electrolyte-saturated capacity;
   c. charging said battery to a preselected intermediate degree;

d. filling said battery with sufficient water and/or sulfuric acid to provide about one hundred percent of electrolyte-saturated capacity at termination of battery charging; and e. continuing charging said battery to a preselected degree defining a fully charged state.

17. The method of claim 16 wherein said filling is performed simultaneously with said charging.

18. The method of claim 16 wherein said water and/or acid filled into said battery are chilled to below room temperature.

19. A method for in situ forming a battery having liquid electrolyte-absorbent separators to produce active material surfacing of metal plates on respective sides of said separators, for electrochemical reaction between said plates and resultant electrical energy production by said battery, comprising the steps of:

a. introducing into the battery a quantity of electrolyte, at a temperature below about fifty degrees F., which is less than the one hundred percent electrolyte-saturated capacity of said plates and said separators;

b. charging said battery to produce active material surfacing of said plates to a preselected intermediate degree;

c. filling said battery sufficiently to provide at least the one hundred percent electrolyte-saturated capacity of said plates and separators; and d. further charging said battery to produce further active material surfacing at said plates.

20. The method of claim 19 wherein said electrolyte introduced into said battery is between about 50% and about 90% of battery plate and separator 100% electrolyte-saturated capacity.

21. The method of claim 20 wherein said electrolyte introduced into said battery is about two-thirds of battery plate and separator 100% electrolyte-saturated capacity.

22. The method of claim 21 wherein said electrolyte is cooled to between about 0 and about 50 degrees F.

23. The method of claim 22 wherein said cooled electrolyte is above about −20 degrees F.

24. A method for preventing shorting of adjacent metal plates during battery forming due to dendrite growth therebetween through electrolyte-absorbent separators between said adjacent plates, while in situ forming said battery, comprising:

a. introducing into the battery a quantity of below room temperature electrolyte which is less than battery one hundred percent electrolyte-saturated capacity; and b. charging said battery.

25. The method of claim 24 further comprising:

a. filling said battery with sufficient liquid to provide about one hundred percent of electrolyte-saturated capacity at termination of battery charging; and b. continuing charging said battery to a fully charged state.

* * * * *